US008519661B2

(12) United States Patent
Desportes et al.

(10) Patent No.: US 8,519,661 B2
(45) Date of Patent: Aug. 27, 2013

(54) POWER TRAIN FOR A TRANSPORT VEHICLE, IN PARTICULAR A RAIL VEHICLE, AND METHOD FOR CONTROLLING SAME

(75) Inventors: Guillaume Desportes, Maubourget (FR); Sebastien Belin, Espocy (FR); David Cypers, Odos (FR); Olivier Giacomoni, Juillan (FR)

(73) Assignee: Alstom Transport SA, Levallois-Perret (FR)

( * ) Notice: Subject to any disclaimer, the term of this patent is extended or adjusted under 35 U.S.C. 154(b) by 225 days.

(21) Appl. No.: 13/196,377

(22) Filed: Aug. 2, 2011

(65) Prior Publication Data

US 2012/0056576 A1    Mar. 8, 2012

(30) Foreign Application Priority Data

Aug. 2, 2010   (FR) ...................................... 10 56370

(51) Int. Cl.
*H02P 6/14* (2006.01)
*H02P 1/30* (2006.01)

(52) U.S. Cl.
USPC ............ 318/721; 318/400.3; 318/400.9; 318/400.15; 318/400.17; 318/503

(58) Field of Classification Search
USPC .................. 318/721, 503, 432, 632, 400.02, 318/400.03, 400.15, 400.09, 400.17; 307/9.1
See application file for complete search history.

(56) References Cited

U.S. PATENT DOCUMENTS

| 5,298,812 | A | * | 3/1994 | Bigge | 327/102 |
|---|---|---|---|---|---|
| 5,467,262 | A | * | 11/1995 | Nakata et al. | 363/41 |
| 5,587,891 | A | * | 12/1996 | Nakata et al. | 363/41 |
| 6,465,977 | B1 | * | 10/2002 | Farkas et al. | 318/432 |
| 7,183,728 | B2 | * | 2/2007 | Kitajima et al. | 318/109 |
| 7,586,768 | B2 | * | 9/2009 | Yoshimoto | 363/71 |
| 7,659,689 | B2 | * | 2/2010 | Yoshimoto et al. | 318/811 |
| 7,986,116 | B2 | * | 7/2011 | Imura et al. | 318/400.15 |
| 7,986,117 | B2 | * | 7/2011 | Yamamoto et al. | 318/400.26 |

(Continued)

FOREIGN PATENT DOCUMENTS

| EP | 1662650 A1 | 5/2006 |
|---|---|---|
| EP | 2037560 A1 | 3/2009 |
| EP | 2139106 A1 | 12/2009 |
| JP | 63299793 A | 7/1988 |

*Primary Examiner* — Paul Ip
(74) *Attorney, Agent, or Firm* — Davidson, Davidson & Kappel, LLC

(57) ABSTRACT

A power train for a transport vehicle is provided. The power train includes an electric motor comprising a shaft, a stator and a rotor, a power supply system receiving direct input voltage and delivering a polyphase voltage to the motor. The system has a modulation factor equal to the voltage amplitude of each phase of the motor divided by the direct input voltage, and includes a sensor for the rotational speed of the rotor. The power train includes a control device for varying the modulation factor that is adapted to decrease the modulation factor relative to the modulation factor in the absence of a device for varying the modulation factor, when the speed of rotation of the rotor belongs to a first interval of values below a predetermined transition value, and adapted to increase the modulation factor relative to the modulation factor in the absence of a device for varying the modulation factor, when the speed of rotation of the rotor belongs to a second interval of values greater than the predetermined transition value. A method and transport vehicle are also provided.

17 Claims, 4 Drawing Sheets

(56) References Cited

U.S. PATENT DOCUMENTS

| | | | |
|---|---|---|---|
| 8,018,185 B2* | 9/2011 | Yamamoto et al. | 318/400.15 |
| 8,063,596 B2* | 11/2011 | Imura | 318/400.09 |
| 8,148,937 B2* | 4/2012 | Itoh et al. | 318/809 |
| 8,193,743 B2* | 6/2012 | Yamada et al. | 318/162 |
| 8,232,753 B2* | 7/2012 | Shimada et al. | 318/400.09 |
| 8,269,439 B2* | 9/2012 | Itoh | 318/400.09 |
| 8,278,855 B2* | 10/2012 | Kitanaka | 318/400.22 |
| 8,278,865 B2* | 10/2012 | Shimada et al. | 318/503 |
| 8,288,980 B2* | 10/2012 | Yamamoto et al. | 318/432 |
| 8,344,680 B2* | 1/2013 | Kitanaka | 318/632 |
| 8,373,380 B2* | 2/2013 | Hayashi | 318/799 |
| 8,395,277 B2* | 3/2013 | Yamakawa et al. | 307/9.1 |
| 2006/0091833 A1* | 5/2006 | Kitajima et al. | 318/109 |
| 2007/0194746 A1* | 8/2007 | Yoshimoto | 318/801 |
| 2007/0216338 A1* | 9/2007 | Yoshimoto et al. | 318/800 |
| 2009/0146589 A1* | 6/2009 | Hattori et al. | 318/400.02 |
| 2009/0237021 A1* | 9/2009 | Yamamoto et al. | 318/400.15 |
| 2009/0237022 A1* | 9/2009 | Yamamoto et al. | 318/400.26 |
| 2009/0243522 A1* | 10/2009 | Suhama et al. | 318/376 |
| 2009/0309525 A1* | 12/2009 | Kubo et al. | 318/400.3 |
| 2010/0013421 A1* | 1/2010 | Itoh | 318/400.09 |
| 2010/0123418 A1* | 5/2010 | Itoh et al. | 318/400.02 |
| 2010/0134053 A1* | 6/2010 | Yamada et al. | 318/162 |
| 2010/0201294 A1* | 8/2010 | Yuuki et al. | 318/400.3 |
| 2010/0259207 A1* | 10/2010 | Kitanaka | 318/400.17 |
| 2011/0050137 A1* | 3/2011 | Imura et al. | 318/400.15 |
| 2011/0080125 A1* | 4/2011 | Shimada et al. | 318/400.09 |
| 2011/0080131 A1* | 4/2011 | Shimada et al. | 318/503 |
| 2011/0115420 A1* | 5/2011 | Yamada | 318/400.09 |
| 2011/0187308 A1* | 8/2011 | Suhama et al. | 318/798 |
| 2011/0273125 A1* | 11/2011 | Yamada et al. | 318/503 |
| 2011/0298403 A1* | 12/2011 | Yamamoto et al. | 318/400.02 |

* cited by examiner

POWER TRAIN FOR A TRANSPORT VEHICLE, IN PARTICULAR A RAIL VEHICLE, AND METHOD FOR CONTROLLING SAME

Priority is hereby claimed to French Patent Application No. 10 56370 filed on Aug. 2, 2010 and hereby incorporated by reference herein.

The present invention relates to a power train for a transport vehicle, in particular a rail vehicle.

The invention also relates to a transport vehicle, in particular a rail vehicle, equipped with such a power train.

The invention also relates to a method for controlling a power train for a transport vehicle.

BACKGROUND OF THE INVENTION

An electric motor of a power train for a transport vehicle is generally powered by a polyphase voltage via a power supply system. This polyphase voltage is modulated in pulse width. The harmonics of this power voltage cause harmonic currents in the rotor.

However, these caused harmonic currents create losses through Joule and Foucault effect in the rotor, causing significant heating of the rotor.

BRIEF SUMMARY OF THE INVENTION

An object of the present invention provides a power train that may reduce losses by Joule and Foucault effect in the rotor.

The present invention provides an electric motor comprising a shaft, a stator and a rotor, the rotor being rotatably mobile around the axis of the shaft, a power supply system receiving direct input voltage and delivering a polyphase voltage to the motor, the system having a modulation factor equal to the voltage amplitude of each phase of the motor divided by the direct input voltage, and a sensor of a signal representative of the rotational speed of the rotor. The power train also includes a means for varying the modulation factor adapted to decrease the modulation factor relative to the modulation factor in the absence of a means for varying the modulation factor, when the speed of rotation of the rotor belongs to a first interval of values below a predetermined transition value, and adapted to increase the modulation factor relative to the modulation factor in the absence of a means for varying the modulation factor, when the speed of rotation of the rotor belongs to a second interval of values greater than the predetermined transition value.

According to other preferred embodiments, the power train may include one or more of the following features, considered alone or according to all technically possible combinations:

the rotor is adapted to create a proper magnetic rotor field in a first magnetic direction and to be passed through by another magnetic field, a magnetic rotor field being the sum of the proper magnetic rotor field and the other magnetic field, the proper magnetic rotor field creating a proper rotor flow through the rotor, and the power train includes a means for varying the flow of the magnetic rotor field through the rotor, adapted to decrease the flow of the magnetic rotor field relative to the proper rotor flow, when the speed of rotation of the rotor belongs to the first interval, and adapted to increase the flow of the magnetic rotor field relative to the proper rotor flow, when the speed of rotation of the rotor belongs to the second interval;

the power supply system comprises a first means for generating a main polyphase current intended to power the stator, to create a main magnetic stator field oriented in a second magnetic direction separate from the first magnetic direction, and a second means for generating an additional out-of-phase current relative to the main current and intended to power the stator, to create a secondary magnetic stator field substantially oriented in the first magnetic direction, the additional current having a first sign to decrease the flow of the magnetic rotor field relative to the proper rotor flow, and a sign opposite the first sign to increase the flow of the magnetic rotor field relative to the proper rotor flow;

the power train includes a means for acquiring a signal representative of the motor torque, and the intensity of the additional current depends on the value of the motor torque;

the absolute value of the intensity of the additional current is lower for the high values of the motor torque than for the low values of the motor torque;

the power train includes a means for acquiring a signal representative of the motor torque, and the modulation factor depends on the value of the motor torque;

the predetermined transition value is greater than the value of the speed of rotation of the rotor corresponding to the modulation factor equal to 50%, in the absence of a means for varying the modulation factor;

the power train includes a means for acquiring a signal representative of the motor torque, and the predetermined transition value depends on the value of the motor torque;

the predetermined transition value is lower for high values of the motor torque than for low values of the motor torque;

the union of the first interval and the second interval is connected;

the motor is a synchronous motor;

the synchronous motor is a permanent magnet synchronous motor.

The present invention also provides a transport vehicle, in particular a rail vehicle, comprising a power train as defined above.

The present invention also provides a method for controlling a power train for a transport vehicle, in particular a rail vehicle, comprising an electric motor comprising a shaft, a stator and a rotor, the rotor being rotatably mobile around the axis of the shaft. The method comprising the steps of:

providing the motor with polyphase voltage, using a power supply system receiving a direct input voltage and delivering said polyphase voltage, the system having a modulation factor equal to the voltage amplitude of each phase divided by the direct input voltage, and measuring the speed of rotation of the rotor;

decreasing the modulation factor relative to the modulation factor in the absence of a means for varying the modulation factor, when the speed of rotation of the rotor belongs to a first interval of values below a predetermined transition value, and increasing the modulation factor relative to the modulation factor in the absence of a means for varying the modulation factor, when the speed of rotation of the rotor belongs to a second interval of values greater than the predetermined transition value.

According to another preferred embodiment, the control method may comprise the following feature:

the rotor is adapted to create a proper magnetic rotor field in a first magnetic direction and to be passed through by another magnetic field, a magnetic rotor field being the sum of the proper magnetic rotor field and the other magnetic field, the proper magnetic rotor field creating a proper rotor flow through the rotor, and the control method includes the following steps:

decreasing the flow of the magnetic rotor field through the rotor relative to the proper rotor flow, when the speed of rotation of the rotor belongs to the first interval, and increasing the flow of the magnetic rotor field relative to the proper rotor flow, when the speed of rotation of the rotor belongs to the second interval.

BRIEF DESCRIPTION OF THE DRAWINGS

These features and advantages of the invention will appear upon reading the following description, provided solely as an example, and done in reference to the appended drawings, in which.

DETAILED DESCRIPTION OF THE PREFERRED EMBODIMENT

Figure 1:
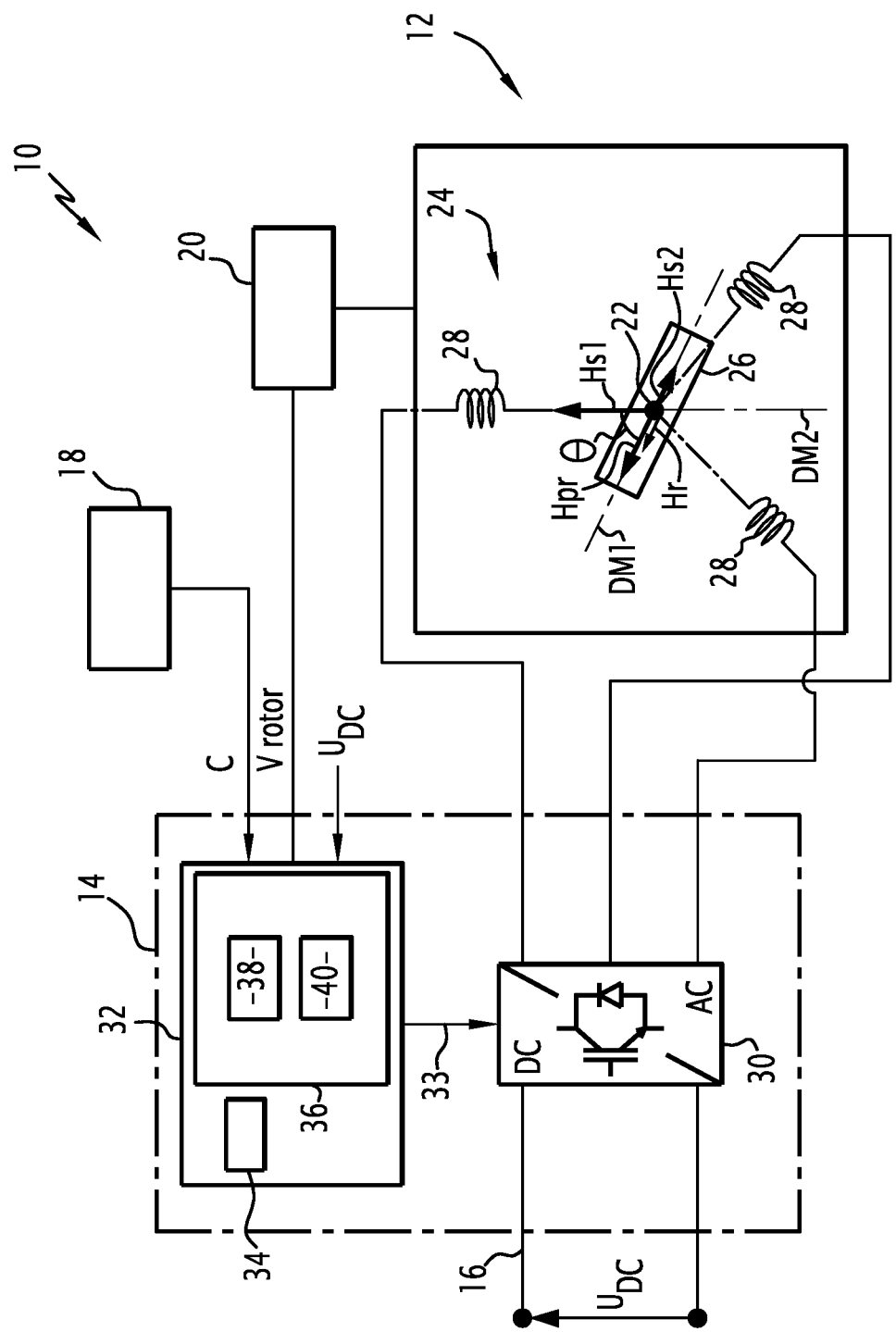
FIG. 1 is a diagrammatic illustration of a power train according to the invention, for a transport vehicle.

A power train 10 for a rail vehicle, illustrated in FIG. 1, comprises an electric motor 12 and a power supply system 14 for the motor, connected to a direct input power voltage bus 16. The direct input voltage has voltage $U_{DC}$.

The power train 10 also includes a means, for example, a receiver or acquisition device 18 for acquiring a signal representative of the motor torque, for example a reference signal for the desired motor torque C and a sensor 20 for measuring the speed of rotation of the rotor Vrotor.

The electric motor 12 includes a drive shaft 22, a stator 24 and a rotor 26 secured to the shaft 22 and adapted to rotate around the axis of the shaft 22. The motor 12 is, for example, a three-phase and synchronous motor. Alternatively, the motor 12 is an asynchronous motor.

The sensor 20 is either in particular an optical sensor placed on the shaft 22 of the motor, or a sensor reading, in the control electronics of the motor 12, velocity information of the motor, in particular a velocity reference of the motor.

The shaft 22 extends along an axis of symmetry of the motor 12.

The stator 24 for example comprises three electromagnetic coils 28. Each coil 28 is made by winding a wire around a magnetic core. The stator 24 is adapted to create a rotary field Hs1, also called main magnetic stator field, under the activity of an adapted feed current Ip, also called main three-phase current.

The rotor 26 is, for example, a permanent magnet with an axis of symmetry combined with the axis of the shaft 22, and the motor 12 is a permanent magnet synchronous motor. Alternatively, the rotor 26 includes one or more electromagnetic coils powered by a direct current.

The magnet of the rotor 26 is intended to create a proper magnetic rotor field Hpr oriented along a first magnetic direction DM1 fixed relative to the rotor 26. Alternatively, the electromagnetic coil(s) of the rotor 26, supplied with direct current, are adapted to create the proper magnetic rotor field Hpr in the first magnetic direction DM1.

The proper magnetic rotor field Hpr creates a proper rotor flow φpr through the rotor 26, equal to the quantity of a proper magnetic rotor field Hpr that passes, for one second, through a transverse section of the rotor 26. The rotor flow Φpr is written in the form of the scalar product of the vector of the magnetic rotor field Hpr and the surface vector corresponding to the transverse section of the rotor 26:

$$\phi pr = \vec{H} pr \cdot \vec{S} \quad \text{(I)}$$

The power supply system 14 comprises a voltage inverter 30 adapted to power the motor 12, and a control device 32 for controlling the inverter.

The voltage inverter 30 is adapted to convert the direct input current circulating on the input bus 16 into a three-phase output voltage delivered to the motor 12. The inverter 30 includes, for each output phase, at least two controllable switches intended to convert a direct voltage into alternating voltage. Each switch of the inverter 30 is, for example, an insulated gate bipolar transistor (IGBT).

The control device 32 is connected to the acquisition means 18 to receive the reference signal of the desired motor torque C, and to the measuring sensor 20 to receive the measuring signal for the speed of rotation of the rotor Vrotor. The control device 32 is connected to the inverter 30 to deliver a signal 33 for controlling at least two switches of the inverter 30.

The control device 32 includes a first generator 38 and a second generator 40. For example, the control device may include an information processing unit formed, for example, by a data processor 34, connected to a memory 36. The memory 36 includes first generator software 38 for generating the main three-phase current Ip and second generator software 40 for generating an additional out-of-phase current Id.

Alternatively, the first generator 38 and the second generator 40 may be made in the form of programmable logic components, or in the form of dedicated integrated circuits.

Each of the phases of the main three-phase current Ip generated by the first generator 38 is intended to power a respective electromagnetic coil 28 of the stator to create a magnetic coil field, the sum of the three coil fields forming the main magnetic stator field Hs1. The main magnetic stator field Hs1 is a rotary field rotating around the shaft 22 of the motor and oriented in a second magnetic direction DM2 separate from the first magnetic direction DM1. The orientation of the main magnetic stator field Hs1 depends on the supply voltage of the respective electromagnetic coils 28. The first magnetic direction DM1 forms, with the second magnetic direction DM2, an angle θ on which the motor torque depends.

The additional current Id generated by the second generator 40 and out of phase relative to the main current Ip is intended to supply the stator 24 to create a secondary magnetic stator field Hs2 substantially oriented in the first magnetic direction DM1. The secondary magnetic stator field Hs2 has a lower intensity than that of the proper magnetic rotor field Hpr.

A magnetic rotor field Hr is the vectorial sum of the proper magnetic rotor field and the secondary magnetic stator field Hs2 oriented in the same first magnetic direction DM1, and is written:

$$\vec{H}r = \vec{H}pr + \vec{H}s2 \qquad (II)$$

In other words, when the proper magnetic rotor field Hpr and the secondary magnetic stator field Hs2 are of opposite directions, the intensity of the magnetic rotor field Hr is the difference between the intensity of the proper rotor field Hpr and that of the secondary magnetic stator field Hs2. When the proper magnetic rotor field Hpr and the secondary magnetic stator field Hs2 are of the same direction, the intensity of the magnetic rotor field Hr is the sum of the intensities of the proper rotor field Hpr and the secondary magnetic stator field Hs2.

The magnetic rotor field Hr creates a magnetic rotor field flow Φr, also called rotor flow, equal to the quantity of the magnetic rotor field Hr that passes for one second through a transverse field of the rotor 26. The rotor flow Φr is written in the form of the scalar product of the vector of the magnetic rotor field Hr and the surface vector corresponding to the transverse rotor section 26:

$$\varphi r = \vec{H}r \cdot \vec{S} \qquad (III)$$

A modulation factor Tmod is equal to the voltage amplitude of each phase of the three-phase current divided by the voltage $U_{DC}$ of the direct input voltage. The modulation factor Tmod depends on the supply voltage of the motor 12, which in turn depends on the rotor flow Φr according to Park's equations.

Figure 2:
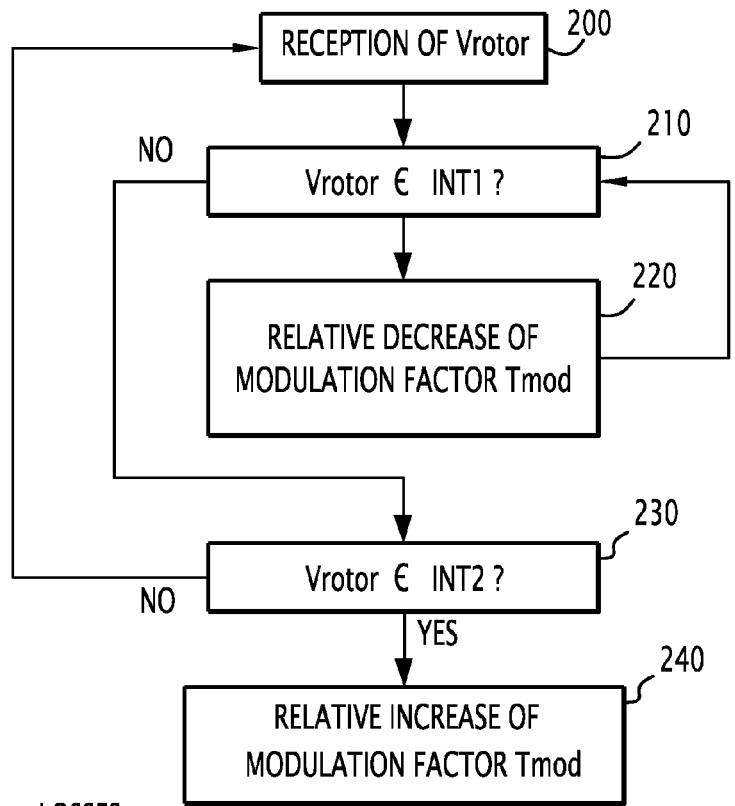
FIG. 2 is a flowchart showing a method for controlling the power train according to the invention.

FIG. 2 illustrates a control method of the power train 10.

In step 200, the measuring sensor 20 of the power train receives the measuring signal for the velocity of the rotor Vrotor.

In step 210, the control device 32 determines whether the measured value of the velocity of the rotor Vrotor belongs to a first interval INT1 of values below a predetermined transition value Vt. If necessary in step 220, a means for varying the modulation factor Tmod decreases the modulation factor Tmod relative to the modulation factor in the absence of a means for varying the modulation factor. The relative decrease in the modulation factor Tmod is for example obtained via a means for varying the flow φr of the magnetic rotor field. In other words, when the speed of the rotor Vrotor belongs to the first interval INT1, the means for varying the flow decreases the flow Φr of the magnetic rotor field relative to the proper rotor flow φpr. The flow Φr is then lower than the proper rotor flow φpr.

Figure 3:
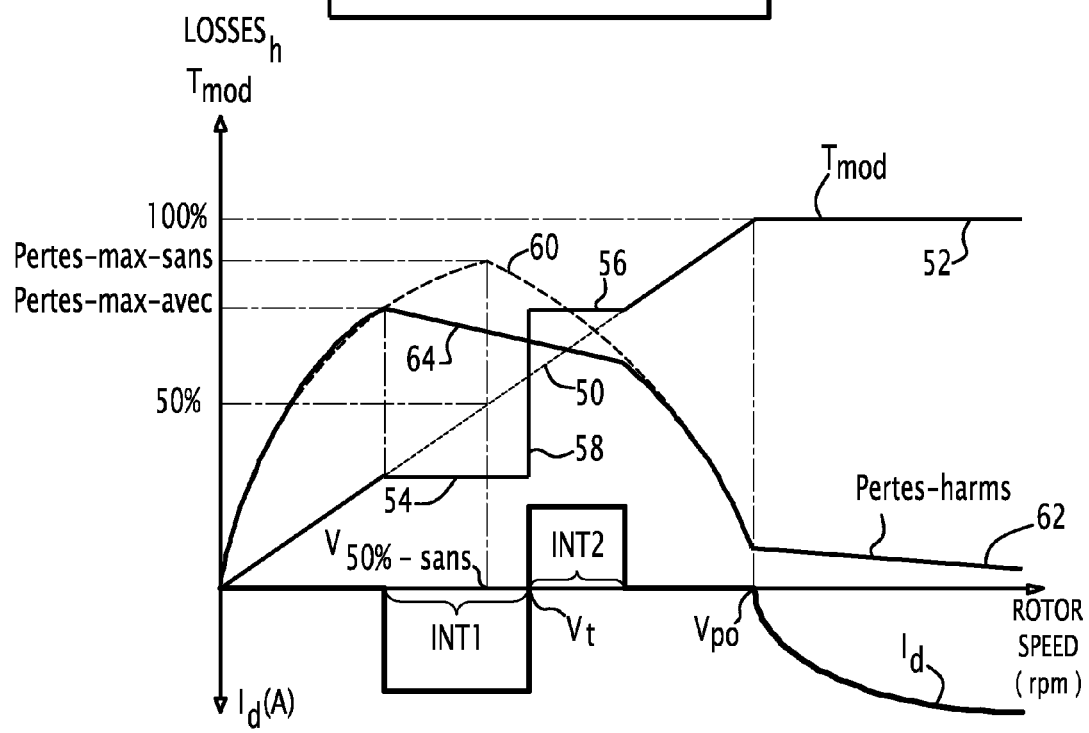
FIG. 3 is a diagrammatic illustration of harmonic loss curves in a rotor of a motor of the power train of FIG. 1, a modulation factor of a power supply system of the train of FIG. 1, a modulation factor of a power supply system of the train of FIG. 1, and an additional out-of-phase current as a function of the rotor speed.

The variation of the modulation factor Tmod as a function of the velocity of the rotor Vrotor is shown in FIG. 3. The velocity of the rotor Vrotor is also called rotor speed, or speed of rotation of the motor, the rotor 26 being the moving element of the motor 12. The rotor speed Vrotor is expressed in revolutions per minute. The curve in broken lines corresponding to the variation of the modulation factor, and the curve in solid lines corresponding to the variation of the modulation factor Tmod with the implementation of the means for varying the modulation factor for the first interval INT1 and a second interval INT2 of value greater than the predetermined transition value Vt.

The curve in broken lines includes a first portion 50 for which the modulation factor Tmod is an affine function of the rotor speed Vrotor, the modulation factor varying from 0% to 100%, and a second portion 52 for which the modulation factor Tmod is substantially constant and equal to 100% for a rotor speed Vrotor greater than a full wave value Vpo. The second portion 52 is also called full wave portion and corresponds to an operation of the motor 12 in full wave rating.

The curve in solid lines is substantially combined with the curve in broken lines for the values of the rotor speed Vrotor not belonging to the first interval INT1 and the second interval INT2. For the values of the rotor speed Vrotor belonging to the interval INT1, the modulation factor Tmod has a defluxing portion 54 for which the modulation factor Tmod is substantially constant and below the corresponding values of the first portion 50 of the curve in broken lines.

In other words, step 220 corresponds to the defluxing portion 54.

In the event the measured value of the rotor speed Vrotor does not belong to the first value interval INT1, the control device 32 goes to step 230, where it determines whether the value of the rotor speed Vrotor belongs to the second interval INT2 of values greater than the predetermined transition value Vt. If applicable in step 240, the means for varying the modulation factor Tmod increases the modulation factor Tmod relative to the modulation factor in the absence of a means for varying the modulation factor. The relative increase of the modulation factor Tmod is for example obtained via a means for varying the flow φr of the magnetic rotor field. In other words, when the speed of the rotor Vrotor belongs to the second interval INT2, the means for varying the flow increases the flow Φr of the magnetic rotor field relative to the proper rotor flow φpr. The flow Φr is then greater than the proper rotor flow φpr.

Step 240 corresponds to an over-fluxing portion 56 of the curve in solid lines, for which the modulation factor Tmod is substantially constant and greater than the corresponding values of the first portion 50 of the curve in broken lines.

If the measured value of the rotor speed Vrotor does not belong to the second value interval INT2, the control device 32 does not modify the modulation factor Tmod and returns to step 200.

The defluxing portion 54 and the over-fluxing portion 56 of the curve in solid lines in FIG. 3 are connected to each other by a substantially linear and vertical connecting portion 58. The connecting portion 58 corresponds to the predetermined transition value Vt of the rotor speed.

The predetermined transition value Vt is greater than the value of the speed of rotation of the rotor $V_{50}\%\_{sans}$ corresponding to the modulation factor equal to 50% in the absence of the means for varying the modulation factor.

To decrease the rotor flow Φr relative to the proper rotor flow φpr, the second means 40 is adapted to generate an additional current Id with a first sign, so that the secondary magnetic stator field Hs2 created is in the direction opposite the proper rotor field Hpr. The intensity of the magnetic rotor field Hr is different from the intensity of the proper rotor field Hpr and that of the secondary magnetic stator field Hs2, so that the rotor flow Φr is less than the proper rotor flow Φpr.

To increase the rotor flow Φr relative to the proper rotor flow φpr, the second means 40 is adapted to generate an additional current Id with a sign opposite the first sign, so that the secondary magnetic stator field Hs2 created and the proper rotor field Hpr are in the same direction. The intensity of the magnetic rotor field Hr is then the sum of the intensity of the proper rotor field Hpr and that of the secondary magnetic stator field Hs2, so that the rotor flow Φr is greater than the proper rotor flow Φpr.

In other words, the additional current Id has the first sign for the values of the rotor speed Vrotor belonging to the first interval INT1, and the additional current Id has the sign opposite the first sign for the values of the speed of rotation of the rotor Vrotor belonging to the second interval INT2. In the embodiment of FIG. 3, the first sign is the negative sign.

The union of the first interval INT1 and the second interval INT2 is, for example, connected. Alternatively, the first interval INT1 is disjointed from the second interval INT2.

The variation of the harmonic losses Pertes_harm in the rotor 26 as a function of the rotor speed Vrotor is shown in FIG. 3, the curve in broken lines corresponding to the variations of harmonic losses without implementing a means for varying the modulation factor, and the curve in solid lines corresponding to the variation of the harmonics losses with implementation of a means for varying the modulation factor.

The curve in broken lines for the harmonic losses Pertes_harm shows a first portion 60 substantially in the shape of a parabola for values of the rotor speed Vrotor below the full wave value Vpo and a second portion 62 that is substantially linear and decreasing for values of the rotor speed Vrotor greater than the full wave value Vpo. The first portion 60 has a maximum value Pertes_max_sans for a corresponding modulation factor Tmod substantially equal to 50%.

The curve in solid lines for the harmonic losses Pertes_harm is substantially combined with the curve in dotted lines for values of the rotor speed Vrotor that do not belong to intervals INT1 and INT2. The curve in solid lines includes a portion for variation of the flow 64 corresponding to the value of the rotor speed Vrotor belonging to the intervals INT1 and INT2. The variation portion of the flow 64 is substantially linear and decreasing, and has values lower than the corresponding portion 60 of the curve in broken lines. The curve in solid lines has a maximum value Pertes_max_avec for a value of the rotor speed Vrotor corresponding to the lower limit of interval INT1. The maximum value Pertes_max_avec of the curve in solid lines is below the maximum value Pertes_max_sans of the curve in broken lines.

Figure 4:
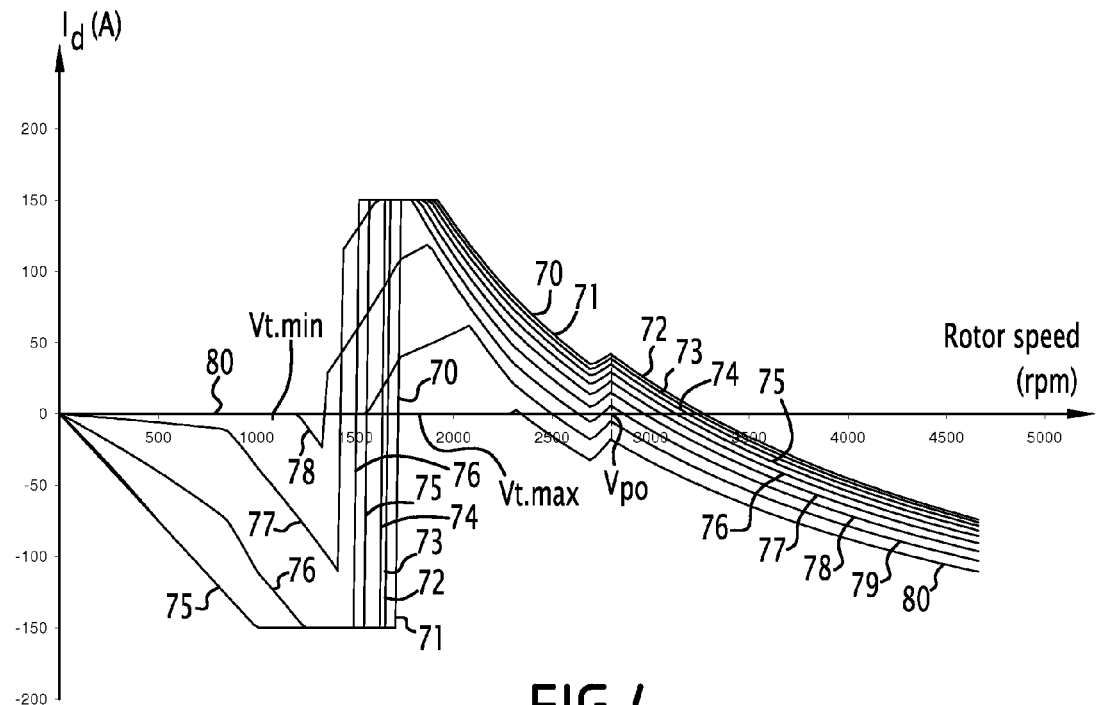
FIG. 4 is a set of curves showing the evolution of the additional out-of-phase current of FIG. 3 as a function of the rotor speed, for values of a desired motor torque reference varying from 0.5% to 100% by 10% pitch.

In FIG. 4, curves 70 to 80 show the evolution of the out-of-phase current Id as a function of the rotor speed Vrotor, for values of the reference of the desired motor torque C varying from 0.5% to 100%, by 10% pitch. Curves 70, 71, 72, 73, 74, 75, 76, 77, 78, 79 and 80 thus correspond to a value of the reference of the desired motor torque C respectively equal to 0.5%, 10%, 20%, 30%, 40%, 50%, 60%, 70%, 80%, 90% and 100%.

The intensity of the additional current Id depends on the value of the reference of the desired motor torque C. The absolute value of the intensity of the additional current Id is lower for high values of the motor torque C than for low values of the motor torque C.

The predetermined transition value Vt depends on the value of the reference of the desired motor torque C. The predetermined transition value Vt is lower for high values of the motor torque C than for low values of the motor torque C. The predetermined transition value Vt varies between a minimum value Vt_min for the value of the desired motor torque C equal to 100%, and a maximum value Vt_max when the desired motor torque C is equal to 0.5%. The minimum value Vt_min is substantially equal to 1100 rpm, and the maximum value Vt_max is substantially equal to 1800 rpm. In other words, the predetermined transition value Vt decrease from 1800 rpm to 1100 rpm when the value of the desired motor torque C increases from 0.5% to 100%. The predetermined transition value Vt is not visible in FIG. 4 for the values of the desired motor torque C equal to 90% and 100%, because the additional current Id is zero in this speed range.

The full wave value Vpo is substantially independent of the value of the reference of the desired motor torque C, and is substantially equal to 2800 rpm.

The first interval INT1 corresponds substantially to values between 0 rpm and 1500 rpm, and the second interval INT2 corresponds substantially to values in the interval from 1500 rpm to 3300 rpm.

Figure 5:
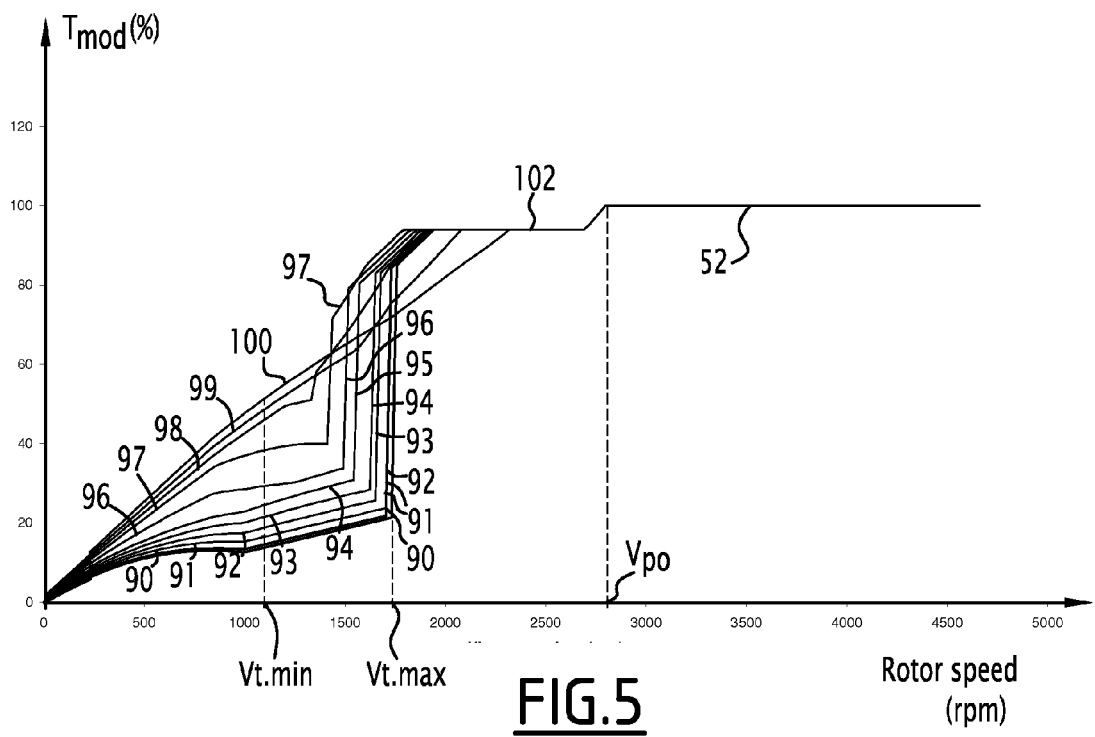
FIG. 5 is a set of curves showing the evolution of the modulation factor of FIG. 3 as a function of the speed of the rotor for references of the desired motor torque varying from 0.5% to 100% by 10% pitch.

In FIG. 5, curves 90 to 100 show the evolution of the modulation factor Tmod expressed in percentage, as a function of the rotor speed Vrotor, for values of the reference of the desired motor torque C varying from 0.5% to 100%, by 10% pitch. Curves 90, 91, 92, 93, 94, 95, 96, 97, 98, 99 and 100 thus correspond to values of the reference of the desired engine torque respectively equal to 0.5%, 10%, 20%, 30%, 40%, 50%, 60%, 70%, 80%, 90% and 100%.

The modulation factor Tmod depends on the value of the reference of the desired motor torque C. The slope of the defluxing portion is lower for small values of the reference of the desired motor torque C than for high values of the reference of the desired motor torque C. In particular, the defluxing portions of curves 90 to 98 are substantially parallel and have a low slope, such that the variation of the modulation factor Tmod is low for the value interval of the rotor speed Vrotor comprised between 500 rpm and 1500 rpm. For curves 99 to 100, the defluxing portion of the curve of the modulation factor Tmod is substantially an affine function of the rotor speed Vrotor, and the modulation factor Tmod varies more significantly in the value interval of the rotor speed Vrotor between 500 rpm and 1500 rpm, than for curves 90 to 98. This is related to the additional current Id, which is null for curves 99 and 100, in the speed range below 1500 rpm.

Similarly to FIG. 4, the predetermined transition value Vt varies between the minimum value Vt_min substantially equal to 1100 rpm for the value of the desired motor torque C equal to 100%, and the maximum value Vt_max substantially equal to 1800 rpm for the value of the desired motor torque C equal to 0.5%.

Each of curves 90 to 100 shows a horizontal portion 102, separate from the defluxing portion 56 of FIG. 3, for which the value of the modulation factor Tmod is substantially constant and equal to 95%. This horizontal portion 102 makes it possible to respect temperature constraints that depend on the switching losses of the inverter 30. For curves 90 to 98, the horizontal portion 102 corresponds to values of the rotor speed Vrotor between about 1900 rpm and 2700 rpm. For curve 99, the horizontal portion 102 corresponds to values of the rotor speed Vrotor between about 2000 rpm and 2700 rpm. For curve 100, the horizontal portion 102 corresponds to values of the rotor speed Vrotor between about 2300 rpm and 2700 rpm.

Each of curves 90 to 100 includes the full wave portion 52 for which the value of the modulation factor Tmod is substantially constant and equal to 100%. The full wave value Vpo is substantially identical for all of the values of the reference of the desired motor torque C, and is substantially equal to 2800 rpm.

Figure 6:
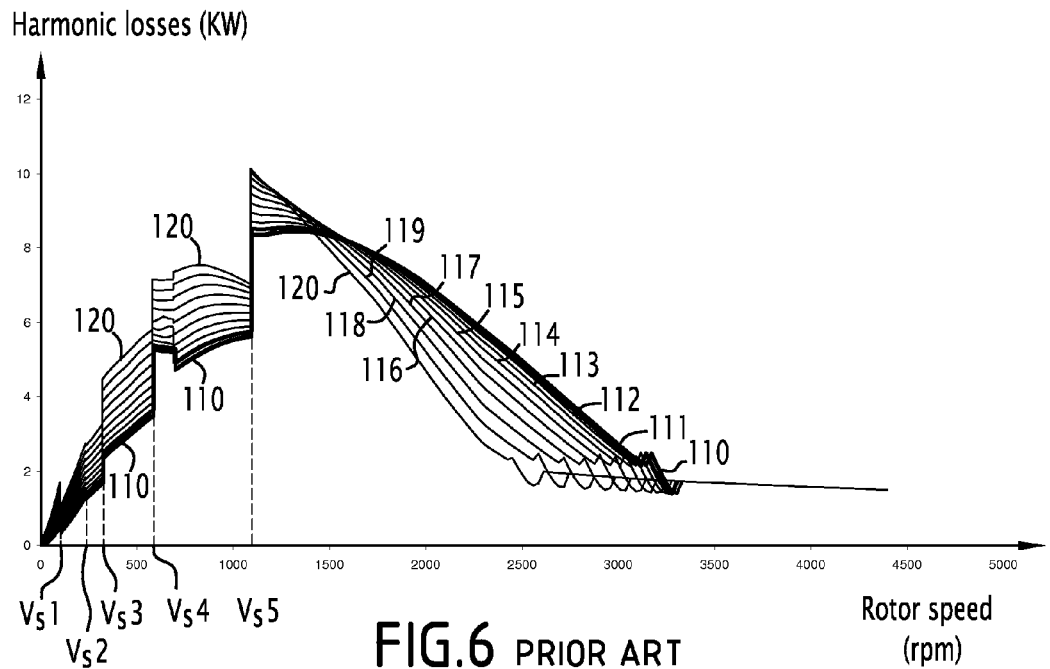
FIG. 6 is a set of curves showing the harmonic losses of a power train in the state of the art as a function of the rotor speed, for references of the desired motor torque varying from 0.5% to 100% by 10% pitch.

In FIG. 6, curves 110 to 120 show the evolution of the harmonic losses Pertes_harm in the rotor of a motor of the state of the art, expressed in kW, as a function of the rotor speed Vrotor, for values of the reference of the desired motor torque C varying from 0.5% to 100%, by 10% pitches. Curves 110, 111, 112, 113, 114, 115, 116, 117, 118, 119 and 120 thus correspond to a value of the reference of the desired motor torque C respectively equal to 0.5%, 10%, 20%, 30%, 40%, 50%, 60%, 70%, 80%, 90% and 100%.

Each of curves 110 to 120 for harmonic losses Pertes_harm includes substantially vertical portions for five distinct values Vs1, Vs2, Vs3, Vs4 and Vs5 of the rotor speed. These vertical portions correspond to significant variations of the harmonic losses Pertes_harm, in particular for values Vs3, Vs4 and Vs5 of the rotor speed. The three-phase voltage delivered to the motor is, for example, modulated in pulse width. The five distinct values Vs1, Vs2, Vs3, Vs4 and Vs5 of the rotor speed each correspond to a change from one pulse width modulation to another pulse width modulation.

Curves 110 to 120 are substantially close to each other, and the maximum deviation of harmonic losses between the extreme curves 110 and 120 is substantially below 2 kW for any value of the rotor speed below 2000 rpm. Between 2000 rpm and 2500 rpm, the maximum harmonic loss deviation between the extreme curves 110 and 120 is substantially between 2 kW and 3 kW. Beyond 2500 rpm, the maximum harmonic loss deviation between the extreme curves 110 and 120 decreases gradually from 2 kW to a substantially zero deviation beyond 3350 rpm.

For values of the rotor speed between Vs3 and Vs4, the harmonic losses are substantially between 2.5 kW and 3.5 kW for curve 110 and between 4.5 kW and 5.75 kW for curve 120.

For values of the rotor speed between Vs4 and Vs5, the harmonic losses are substantially between 5 kW for curve 110 and 7 kW for curve 120.

The harmonic losses go through a maximum between 8.25 kW for curve 110 and 10 kW for curve 120, for the value of the rotor speed equal to Vs5.

The full wave value Vpo depends on the value of the reference of the desired motor torque C, when the means for varying the modulation factor is not implemented. The full wave value Vpo is between about 2600 rpm for the value of the reference of the desired motor torque C equal to 100%, and about 3350 rpm for the value of the reference of the desired motor torque C equal to 0.5%. For values of the rotor speed greater than the largest full wave value Vpo, curves 110 to 120 are substantially combined, and have harmonic loss values Pertes_harm of less than 2 kW.

Figure 7:
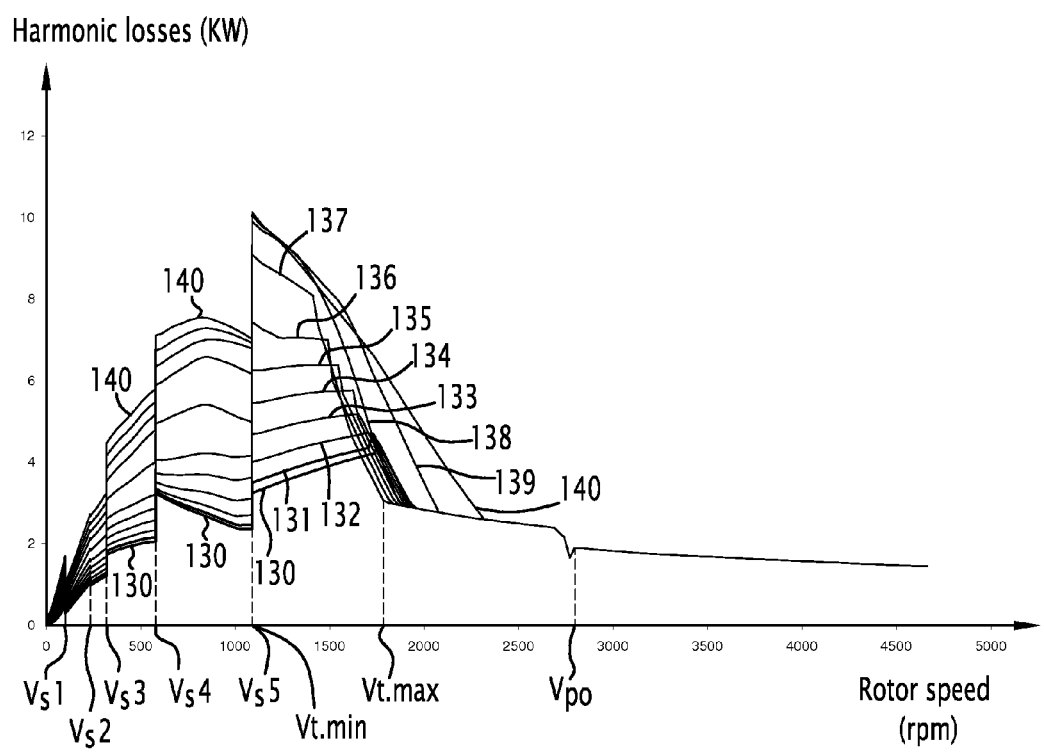
FIG. 7 is a set of curves showing the harmonic losses of FIG. 2 as a function of the rotor speed, for references of the desired motor torque varying from 0.5% to 100% by 10% pitch.

In FIG. 7, curves 130 to 140 show the evolution of the harmonic losses Pertes_harm in the rotor 26 of the motor, expressed in kW, as a function of the rotor speed Vrotor, for values of the reference of the desired motor torque C varying from 0.5% to 100%, by 10% pitch. Curves 130, 131, 132, 133, 134, 135, 136, 137, 138, 139 and 140 thus correspond to a value of the reference of the desired motor torque C respectively equal to 0.5%, 10%, 20%, 30%, 40%, 50%, 60%, 70%, 80%, 90% and 100%.

Similarly to FIGS. 4 and 5, the predetermined transition value Vt varies between the minimum value Vt_min substantially equal to 1100 rpm for the value of the desired motor torque C equal to 100%, and the maximum value Vt_max substantially equal to 1800 rpm for the value of the desired motor torque C equal to 0.5%. The full wave value Vpo is substantially equal to 2800 rpm for all of curves 130 to 140.

For each of curves 130 to 140, the transition value Vt corresponds to an inflexion point of the corresponding harmonic loss curve. The harmonic losses Pertes_harm decrease significantly for each of curves 130 to 140, when the rotor speed Vrotor is greater than the transition value Vt.

Similarly to FIG. 6, each of harmonic loss curves 130 to 140 Pertes_harm includes substantially vertical portions for five distinct values Vs1, Vs2, Vs3, Vs4 and Vs5 of the rotor speed, each corresponding to a change of the pulse width modulation to another pulse width modulation. These vertical portions correspond to significant harmonic loss variations Pertes_harm, in particular for the values Vs4 and Vs5 of the rotor speed.

The maximum harmonic loss deviation between the extreme curves 130 and 140 is substantially greater than 3 kW for any value of the rotor speed between Vs3 and Vt_max. For values of the rotor speed greater than the full wave value Vpo, curves 130 to 140 are substantially combined, and have harmonic loss values Pertes_harm below 2 kW.

For values of the rotor speed between Vs3 and Vs4, the harmonic losses are substantially between 2 kW for curve 130 and between 4.5 kW and 5.75 kW for curve 140.

For values of the rotor speed between Vs4 and Vs5, the harmonic losses are substantially between 2.25 kW and 3 kW for curve 130 and 7 kW for curve 140.

The harmonic losses go through a maximum between 4 kW for curve 130 for the rotor speed value equal to Vt_max, and 10 kW for curve 140 for the rotor speed value equal to Vs5.

The harmonic losses corresponding to curves 120 and 140 are substantially identical for all values of the rotor speed.

The harmonic losses corresponding to curve 130 are much lower than those corresponding to curve 110.

Thus, the harmonic losses with implementation of a means for varying the modulation factor are lower when the value of the reference of the motor torque is lower. The harmonic losses with implementation of the means for varying the modulation factor are comparatively much lower than those without implementing the means for varying the modulation factor for low values of the reference of the motor torque, than for high values of the reference of the motor torque.

Thus, the power train 10 according to the invention may decrease the flow Φr of the magnetic rotor field relative to the proper flow of the rotor Φpr, when the speed of rotation of the rotor Vrotor belongs to the first interval INT1. This decrease of the rotor flow Φr causes a decrease in the supply voltage of the motor. This decrease in the supply voltage of the motor 12 causes a slower evolution of the modulation factor Tmod in the defluxing portion 54. In this defluxing portion 54, the value of the modulation factor Tmod is below 50%, which may reduce the harmonic losses Pertes_harm. In fact, the modulation factor Tmod equal to 50% is substantially the value that generates the greatest harmonic losses.

The power train 10 according to the invention also may increase the flow of the rotor field Φr relative to the proper flow of the rotor Φpr, when the speed of rotation of the rotor Vrotor belongs to a second interval INT2 of values greater than the predetermined transition value Vt. This increase of the rotor flow Φr causes an increase in the supply voltage, and as a result a faster evolution of the modulation factor Tmod in the over-fluxing portion 56. This greater evolution of the modulation factor Tmod does not cause an increase in the harmonic losses Pertes_harm, since the over-fluxing portion 56 follows the defluxing portion 54 for which the value of the modulation factor equal to 50% and its corresponding maximum of harmonic losses have been avoided.

The power train according to the invention thus may reduce the losses caused by Joule and Foucault effect in the rotor.

One skilled in the art will understand that the invention more generally applies to a poly-phase voltage inverter 30, adapted to power a polyphase motor 12.

What is claimed is:
1. A power train for a transport vehicle comprising:
an electric motor including a shaft, a stator and a rotor, the rotor being rotatable around an axis of the shaft;
a power supply system receiving a direct input voltage and delivering a polyphase voltage to the motor, the power supply system having a modulation factor equal to a voltage amplitude of each phase of the motor divided by the direct input voltage;

a sensor of a signal representative of the rotational speed of the rotor; and a control device for varying the modulation factor that decreases the modulation factor relative to the modulation factor in the absence of a means for varying the modulation factor, when a speed of rotation of the rotor belongs to a first interval of values below a predetermined transition value, and adapted to increase the modulation factor relative to the modulation factor in the absence of a means for varying the modulation factor, when the speed of rotation of the rotor belongs to a second interval of values greater than the predetermined transition value.

2. The power train according to claim 1, wherein the rotor is adapted to create a proper magnetic rotor field in a first magnetic direction and to be passed through by another magnetic field, a magnetic rotor field being the sum of the proper magnetic rotor field and the other magnetic field, the proper magnetic rotor field creating a proper rotor flow through the rotor, and wherein the control device varies the flow of the magnetic rotor field through the rotor, adapted to decrease the flow of the magnetic rotor field relative to the proper rotor flow, when the speed of rotation of the rotor belongs to the first interval, and adapted to increase the flow of the magnetic rotor field relative to the proper rotor flow, when the speed of rotation of the rotor belongs to the second interval.

3. The power train according to claim 2, wherein the control device includes a first generator for generating a main polyphase current intended to power the stator, to create a main magnetic stator field oriented in a second magnetic direction separate from the first magnetic direction, and a second generator for generating an additional out-of-phase current relative to the main current and intended to power the stator, to create a secondary magnetic stator field substantially oriented in the first magnetic direction, the additional current having a first sign to decrease the flow of the magnetic rotor field relative to the proper rotor flow, and a sign opposite the first sign to increase the flow of the magnetic rotor field relative to the proper rotor flow.

4. The power train according to claim 3, further comprising a receiver for acquiring a signal representative of the motor torque, and wherein an intensity of the additional current depends on the value of the motor torque.

5. The power train according to claim 4, wherein the absolute value of the intensity of the additional current is lower for the high values of the motor torque than for the low values of the motor torque.

6. The power train according to claim 1, further comprising a receiver for acquiring a signal representative of the motor torque, and wherein the modulation factor depends on the value of the motor torque.

7. The power train according to claim 1, wherein the predetermined transition value is greater than the value of the speed of rotation of the rotor corresponding to the modulation factor equal to 50%, in the absence of a means for varying the modulation factor.

8. The power train according to claim 1, further comprising a receiver for acquiring a signal representative of the motor torque, and wherein the predetermined transition value depends on the value of the motor torque.

9. The power train according to claim 8, wherein the predetermined transition value is lower for high values of the motor torque than for low values of the motor torque.

10. The power train according to claim 1, wherein the union of the first interval and the second interval is connected.

11. The power train according to claim 1, wherein the motor is a synchronous motor.

12. The power train according to claim 11, wherein the synchronous motor is a permanent magnet synchronous motor.

13. A transport vehicle, comprising a power train according to claim 1.

14. A method for controlling a power train for a transport vehicle comprising an electric motor comprising a shaft, a stator and a rotor, the rotor being rotatable around the axis of the shaft, the method comprising the steps of:

providing the motor with a polyphase voltage, using a power supply system receiving a direct input voltage and delivering the polyphase voltage, the system having a modulation factor equal to the voltage amplitude of each phase divided by the direct input voltage;

measuring the speed of rotation of the rotor;

decreasing the modulation factor relative to the modulation factor in the absence of a means for varying the modulation factor, when the speed of rotation of the rotor belongs to a first interval of values below a predetermined transition value; and increasing the modulation factor relative to the modulation factor in the absence of a means for varying the modulation factor, when the speed of rotation of the rotor belongs to a second interval of values greater than the predetermined transition value.

15. The control method according to claim 14, wherein the rotor is adapted to create a proper magnetic rotor field in a first magnetic direction and to be passed through by another magnetic field, a magnetic rotor field being the sum of the proper magnetic rotor field and the other magnetic field, the proper magnetic rotor field creating a proper rotor flow through the rotor, the method further comprising:

decreasing the flow of the magnetic rotor field through the rotor relative to the proper rotor flow, when the speed of rotation of the rotor belongs to the first interval; and increasing the flow of the magnetic rotor field relative to the proper rotor flow, when the speed of rotation of the rotor belongs to the second interval.

16. The transport vehicle according to claim 13 wherein the transport vehicle is a rail vehicle.

17. The power train for a transport vehicle according to claim 1 wherein the transport vehicle is a rail vehicle.

* * * * *

UNITED STATES PATENT AND TRADEMARK OFFICE
CERTIFICATE OF CORRECTION

PATENT NO. : 8,519,661 B2  
APPLICATION NO. : 13/196377  
DATED : August 27, 2013  
INVENTOR(S) : Guillaume Desportes et al.

Page 1 of 1

It is certified that error appears in the above-identified patent and that said Letters Patent is hereby corrected as shown below:

On the title page, Item (75) the inventors section should read:

Guillaume Desportes, Maubourget (FR); Sebastien Belin, Espoey (FR); David Cypers, Odos (BE); Olivier Giacomoni, Juillan (FR)

Instead of

Guillaume Desportes, Maubourget (FR); Sebastien Belin, Espocy (FR); David Cypers, Odos (FR); Olivier Giacomoni, Juillan (FR)

Signed and Sealed this
Fifteenth Day of April, 2014

Michelle K. Lee
*Deputy Director of the United States Patent and Trademark Office*